United States Patent [19]

Kawaguchi et al.

[11] Patent Number: 4,966,213
[45] Date of Patent: Oct. 30, 1990

[54] PNEUMATIC TIRES WITH APERTURED PUNCTURE SEALING LAYER

[75] Inventors: Yasuyoshi Kawaguchi, Higashiyamato; Masayuki Ohashi, Suginami; Hikaru Tansei, Kodaira, all of Japan

[73] Assignee: Bridgestone Corporation, Tokyo, Japan

[21] Appl. No.: 310,105

[22] Filed: Feb. 14, 1989

[30] Foreign Application Priority Data

Feb. 16, 1988 [JP] Japan .................................. 63-31865

[51] Int. Cl.$^5$ ...................... B29C 73/16; B29C 73/22; B32B 3/10; B32B 31/00
[52] U.S. Cl. ................................... 152/504; 152/505; 428/140; 428/117; 156/290
[58] Field of Search ............... 152/505, 502, 503, 504, 152/510; 428/140, 139, 117; 156/115, 290

[56] References Cited

U.S. PATENT DOCUMENTS

| | | | |
|---|---|---|---|
| 1,977,281 | 10/1934 | Knowlton | 156/115 X |
| 2,332,913 | 10/1943 | Ikhayan | 156/115 |
| 2,345,200 | 3/1944 | Iknayan | 156/115 |
| 2,877,819 | 3/1959 | Gibbs | 152/505 |
| 3,563,294 | 2/1971 | Chien | 152/505 |
| 4,140,167 | 2/1979 | Böhm et al. | 152/505 X |
| 4,165,403 | 8/1979 | Alban | 428/140 |
| 4,256,158 | 3/1981 | Chautard et al. | 152/505 |
| 4,286,643 | 9/1981 | Chemizard | |
| 4,388,261 | 6/1983 | Codispoti et al. | 152/505 X |

FOREIGN PATENT DOCUMENTS

| | | | |
|---|---|---|---|
| 0531490 | 10/1956 | Canada | 152/505 |
| 0135463 | 8/1984 | European Pat. Off. | |
| 0848572 | 10/1939 | France | 156/115 |
| 0015660 | 9/1914 | United Kingdom | 152/503 |

*Primary Examiner*—Robert A. Dawson
*Assistant Examiner*—Gregory J. Wilber
*Attorney, Agent, or Firm*—Sughrue, Mion, Zinn, MacPeak & Seas

[57] ABSTRACT

A pneumatic tire is disclosed, which comprises a carcass ply, two vulcanized rubber composition layers arranged radially inside the carcass ply, and a continuous layer of a sealing material arranged between the two vulcanized rubber composition layers. The sealing material has a viscosity of not more than $6 \times 10^4$ poises at 60° C. Bonding portions are formed through the continuous layer, and discontinuously bond two vulcanized rubber composition layers.

8 Claims, 4 Drawing Sheets

Nail–piercing location

PNEUMATIC TIRES WITH APERTURED PUNCTURE SEALING LAYER

BACKGROUND OF THE INVENTION (1) Field of the Invention:

The present invention relates to pneumatic tires which can remarkably decrease the air-leaking speed at which air leaks when the tire treads on a nail or the like.

(2) Related Art Statement:

Heretofore, techniques have been known, in which air leakage is prevented by providing an adhesive rubber layer on an inner surface of a tire and adhering the rubber to a nail or the like entering the tire (Japanese Pat. Application Laid-open Nos. 55-11,998, 55-15,397, 0-64,834, etc.).

However, in such a conventional tire having the adhesive rubber layer provided on the tire inner surface, since the inner surface of the adhesive layer is exposed to air, the layer is deteriorated during use to hinder attainment of the intended object.

In order that the adhesive layer may attain the object of sealing a puncture at a place where the nail enters the tire, the thickness of the adhesive layer there needs to be 3 to 5 mm. Consequently, the tire becomes heavy, so that fuel consumption rate and heat generation resistance are deteriorated. Furthermore, since the adhesive layer gathers near the equatorial plane of the tire due to centrifugal forces during rotation of the tire or since the adhesive layer gathers at one location during long parking, it is difficult to maintain the adhesive layer in a state that the adhesive layer can exhibit its effect wherever a nail enters the tire. In addition, a kneader and a coating system which have not been required in the conventional tire production lines are necessary for the production of such adhesive layers.

Under the circumstances, although conventional tires which are each provided with an adhesive layer at the tire inner surface have certain air leakage-preventing effects, it is an actual situation that such tires have hardly been put into the market as products.

SUMMARY OF THE INVENTION

It is an object of the present invention to overcome all the above-mentioned problems, and to provide excellent pneumatic tires in which air leakage is reduced while other aspects of tire performance are not deteriorated.

The present inventors had strenuously made examinations to solve the problems of the above-mentioned conventional techniques. Consequently, they have found that the above object could be accomplished by constructing the pneumatic tire as mentioned below, and they have come to accomplish the present invention.

That is, the present invention relates to a pneumatic tire comprising a carcass ply, two vulcanized rubber composition layers arranged radially inside the carcass ply, a continuous layer of a sealing material arranged between the two vulcanized rubber composition layers, the sealing material having a viscosity of not more than $6 \times 10^4$ poises at 60° C., and bonding portions discontinuously bonding the two vulcanized rubber composition layers, the bonding portions passing through the continuous layer.

These and other objects, features, and advantages of the invention will be appreciated upon reading of the following description of the invention, when taken in connection with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The sealing material used for the sealing material layer in the present invention is mainly composed of at least one material selected from the group consisting essentially of polyethylene, polypropylene, polybutadiene, polyisoprene, polyisoprene-butadiene copolymer, polystyrene-butadiene copolymer, butyl rubber, halogenated butyl rubber, acrylonitrile-butadiene copolymer, silicon rubber, and a thermoplastic resin. The sealing material has a viscosity of not more than $6 \times 10^4$ poises 60° C. When the sealing material is colored in a color different from that of a tire tread, a judgment as to whether or not or where air leakage occurs can be easily made. For this purpose, the viscosity of the sealing material is preferably not more than $5 \times 10^3$ poises at 60° C.

The sealing material is a material which forms a sheet (Viscosity: not less than $3 \times 10^4$ poises) at room temperature. Thus, it is possible to treat the sealing material itself in the form of the sheet.

The sectional shape of the bonding portion in the present invention is designed such that even when a circle having a diameter of 2 mm is drawn passing through any location of the bonding portion, the bonding portion contacts the continuous layer within this circle.

More particularly, the following techniques may be employed by way of example.

Figure 1:
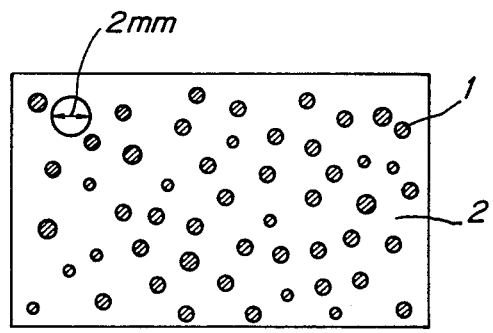
FIG. 1 is a plan view illustrating a layer of a sealing material, which has small round section holes as portions for bonding upper and lower walls of vulcanized rubber composition layer.
Figure 2:
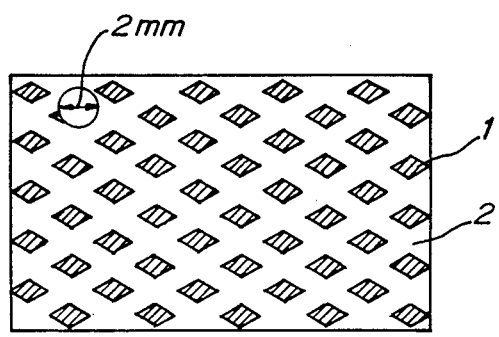
FIG. 2 is a plan view of a sealing material layer which has rhombus section holes as portions for bonding upper and lower walls of vulcanized rubber composition layers.
Figure 3:
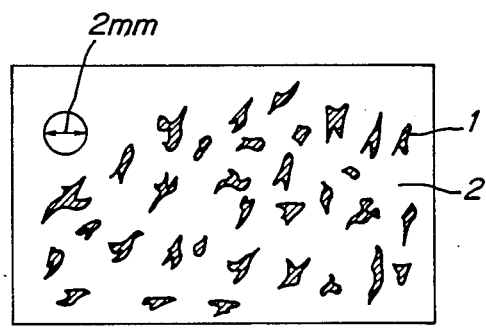
FIG. 3 is a plan view illustrating a sealing material layer which has random cuts as portions for bonding upper and lower walls of vulcanized rubber composition layers.
Figure 4:
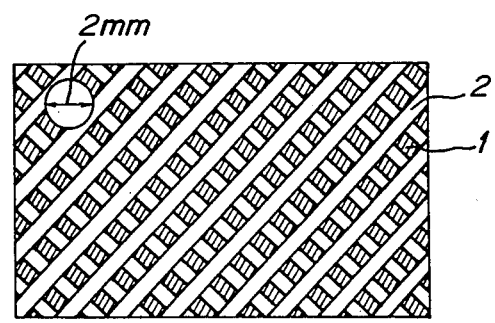
FIG. 4 is a plan view illustrating a sealing material layer formed by laminating strips made of the sealing material in a lattice fashion, in which openings formed therebetween constitute portions for bonding upper and lower walls of rubber composition layers.
Figure 5:
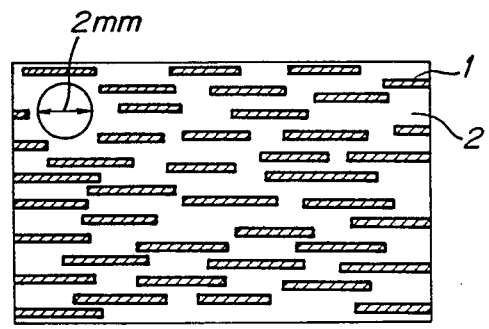
FIG. 5 is a plan view illustrating a sealing material layer which has slit-like holes as portions for bonding upper and lower walls of the rubber composition layers.
Figure 6:
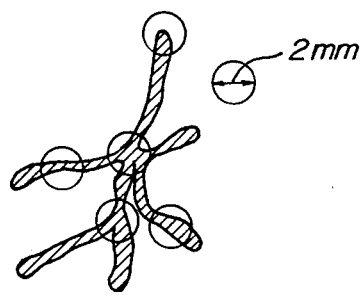
FIGS. 6 and 7 are enlarged views of two examples of the bonding portions illustrated in FIG. 3.

That is, the layer of the sealing material which forms a sheet at ordinary temperature is provided with small round section holes as shown in FIG. 1, through which upper and lower layers made of a vulcanized rubber composition are bonded. As shown in FIG. 2, the sealing material layer is provided with rhombus section holes through which the upper and lower rubber composition layers are bonded. As shown in FIG. 3, the rubber composition layer is provided with random cuts through which upper and lower rubber composition layers are bonded. Alternatively, as shown in FIG. 4, strips made of a sealing material are laminated in a lattice fashion, and upper and lower rubber composition layers are bonded together through openings of the lattice. As shown in FIG. 5, a sealing material layer is provided with slit-like holes through which upper and lower rubber composition layers are bonded. The slit-like bonding portions may be formed in a circumferential or radial direction of the tire, or in a direction forming a certain angle with respect to the tire circumferential direction. In order to prevent flowing of the sealing material in the tire radial direction, it is preferable to extend the bonding portions in the tire circumferential direction as in the case of FIG. 5.

Figure 7:
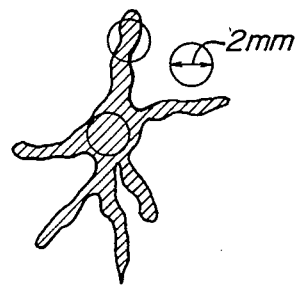
Figure 8:
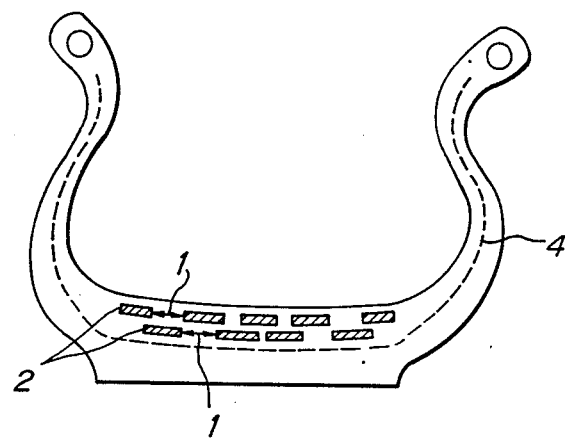
FIG. 8 is a sectional view of a pneumatic tire provided with two layers of a sealing material.

That is, the bonding portion may have any shape. However, it is preferable that even when a circle having a diameter of 2 mm is drawn through any arbitrary location of the bonding portion, the bonding portion may contact the continuous sealing material layer within this circle. Thus, it is preferable to eliminate those bonding portions which do not contact with the continuous layer 2 at all within a circle having a diameter of 2 mm. This is shown in FIG. 7. To the contrary, when the sealing material layer between the vulcanizable rubber composition layers 3 is constituted by two or more sealing material layers as shown in FIG. 8, bonding portions 1 in one sealing material layer 2 may contain an imaginary circle having a diameter of more than 2 mm unless the bonding portions do not completely overlap between the layers.

If necessary, a tackifier, a softener, a filler, etc. may be incorporated into the sealing material layer.

In the present invention, the layers of the vulcanizable rubber composition are arranged radially inside the inner surface of the carcass ply of the tire so that fatigue fracture resistance of the tire may not directly be lowered. In order that the sealing material layer may possess fluidity during running of the tire, the viscosity is set at not more than $6 \times 10^4$ poises at 60° C. It is preferable to select a material having fluidity at 10° C. or more. The sealing material layer is continuous in circumferential and axial directions between the vulcanizable rubber composition layers.

The upper and lower layers made of a vulcanized rubber composition to enclose the sealing material layer are partially, discontinuously bonded together so as to ensure fatigue resistance of a composite body and to restrain air in the sealing material layer. Preferably, the sectional shape of the bonding portion is selected such that even when a circle having a diameter of 2 mm is drawn passing through any location of the bonding portion, the bonding portion contacts with the sealing material layer within this circle. Such is considered preferable, because even when a nail or the like enters the tire, it surely passes through the sealing material layer.

As mentioned above, according to the present invention, the air-sealing member is constituted by the air-sealing material and the vulcanizable rubber composition layers holding the sealing material layer, and the sealing material layer is continued in the circumferential and axial directions. By so constructing, even when a nail or the like enters the tire, the sealing material which is pressed with a tire internal pressure collects around the nail or the like, and seals the tire. The sealing material functions as if it is blood, while the vulcanized rubber composition layers do as if they are muscles.

Even a single sealing material may be treated, during tire building, in the same manner as for ordinary tire-constituting members, if the sealing material has a viscosity of not less than $3 \times 10^4$ poises at ordinary temperature.

Furthermore, in the conventional technique, a great amount of an adhesive sealant is used at a portion of the tire where a nail or the like may enter by utilizing both internal pressure and capillary phenomenon. Compared with this, the same function can be obtained with a smaller amount of the sealant in the present invention. Therefore, the invention is more advantageous with respect to the heat generation characteristic and the fuel consumption rate.

The present invention will now be explained in more detail below.

Figure 9:
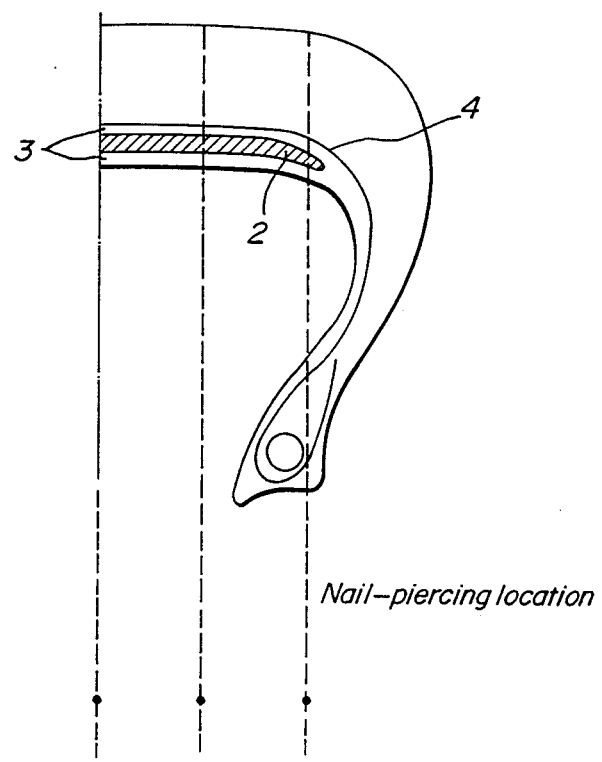
FIG. 9 is a partially sectional view of pneumatic tires used in Experiments.

Passenger car tubeless radial tires having a size of 165 SR 13 shown in FIG. 9 were prepared under conditions given in Table 1 below. As shown in FIG. 9, a vulcanized rubber composition to enclose layers 2 made of a sealing material in the present invention were disposed radially inside a carcass ply 4.

Each of these test tires was fitted to a rear wheel of a vehicle, corroded nails having a diameter of 2 mm and a length of 33 mm were pierced into the tire at locations shown in FIG. 9. The nail-pierced tire was run on a circuit road having a turn distance of 3.5 km at the average speed of 80 km/h. An air pressure was detected every three hours, and then a running distance at which the initial internal pressure of 2.0 kg/cm² was reduced to 1.0 kg/cm² was presumed based on detected data. An air leakage-preventing rate when the nails were pulled out after the running is also given in Table 1. The air leakage-preventing rate is a percentage of the number of locations sealed to prevent air leakage with respect to the total number of all the locations where the nails were pierced into the tire. In addition, an internal temperature of the tire was measured by a thermocouple inserted into a hole preliminarily bored in a central portion of a belt in a diameter of 2 mm after running on the circuit road for 1 hour. Above test results are shown in Table 1, too.

TABLE 1

|  | Comparative Example 1 | Comparative Example 2 | Comparative Example 3 | Example 1 | Example 2 |
|---|---|---|---|---|---|
| Sealing material layer | not provided | Sealing material layer not enclosed with vulcanized rubber (conventional tire) | Sealing material layer enclosed with vulcanized rubber | | |
| Viscosity of sealing material at 60° C. | — | $8 \times 10^4$ | $8 \times 10^4$ | $6 \times 10^4$ | $6 \times 10^4$ |

TABLE 1-continued

|  | Comparative Example 1 | Comparative Example 2 | Comparative Example 3 | Example 1 | Example 2 |
| --- | --- | --- | --- | --- | --- |
| (poises) |  |  |  |  |  |
| Average gauge of sealing material at crown portion (mm) | — | 4.2 | 0.7 | 0.6 | 0.6 |
| Width gauge of bonding portion (mm) | — | — | 2 | 3 | 2 |
| Temperature (°C.) of tire 1 hour after running | 63 | 67 | 64 | 64 | 64 |
| Running distance when internal pressure dropped to 1 kg/cm$^2$ (km) | 1,225 | 1,465 | 1,350 | 1,800 | 2,400 |
| Air leaking-preventing percentage (%) | 0 | 60 | 40 | 90 | 95 |

A syndiotactic 1,2-polybutadiene resin (manufactured by Japan Synthetic Rubber Co., Ltd., Trade name: RB resin (RB805) and a liquid polyisoprene rubber. (manufactured by Kuraray Co., Ltd. Trade name: LIR 50) were mixed, which was adjusted to a given viscosity and used as a sealing material in Table 1.

As is clear from Table 1, Comparative Example 2 exhibited more excellent results than those of Comparative Example 1 having no sealing material layer as a sealant, but was inferior to Examples 1 and 2 of the present invention with respect to the air-sealing performance. This is presumably because the sealing material collects at the tire equatorial plane during the running, and the sealing material less effectively acted with respect to the nails entering the shoulder portions. Further, Comparative Example 2 had a problem in that since the average gauge of the sealing material layer in Comparative Example 2 was greater, its heat generation of the tire was far greater than in Examples 1 and 2.

In Comparative Example 3, since the viscosity of the sealing material was so high as compared with Examples 1 and 2, the sealing material did not collect around the nails, so that no air-sealing effect was exhibited.

As shown in Table 1, although Example 1 exhibited excellent effects with respect to both the running distance and the air leakage-preventing percentage in the state that the nails were pierced into the tire, Example 2 exhibited far more excellent air-sealing effects. In order to clarify reasons therefor, the present inventors decomposed the tire and made detailed examinations. Consequently, the inventors have confirmed that four of all forty nails entered inside the tire without contacting the sealing material. That is, the bonding portion of the upper and lower layers were so great that the four nails completely passed the nail therethrough.

On the other hand, judging from experience of the inventors, nails having a diameter of less than 2 mm extremely seldom penetrate tires.

As explained above, the pneumatic tire according to the present invention is more advantageous with respect to tire heat generation characteristic and fuel consumption rate, since (1) excellent air sealability is exhibited as compared with pneumatic tires provided with conventional adhesive rubber layers, (2) the sealing material can be treated in the same manner as an ordinary tire-constituting members during the tire building, and (3) the same effects as obtained in the conventional technique can be exhibited by using a smaller amount of the sealing material. The present invention is further to provide an effect to easily detect whether or not or where air leakage occurs in the tire by coloring the sealing material in a color different from that of the tire tread.

What is claimed is:

1. A pneumatic tire comprising a carcass ply, two vulcanized rubber composition layers arranged radially inside the carcass ply, a continuous self-supportable apertured layer of a sealing material arranged between the two vulcanized rubber composition layers, said sealing material having a viscosity of not more than $6 \times 10^4$ poises at 60° C., and bonding portions discontinuously bonding said two vulcanized rubber composition layers while passing through the continuous layer.

2. The pneumatic tire according to claim 1, wherein said sealing material is mainly composed of at least one material selected from the group consisting of polyethylene, polypropylene, polybutadiene, polyisoprene, polyisoprene-butadiene copolymer, polystyrene-butadiene copolymer, butyl rubber, halogenated butyl rubber, acrylonitrile-butadiene copolymer, silicon rubber, and a thermoplastic resin.

3. The pneumatic tire according to claim 1, wherein said sealing material has the viscosity of not more than $5 \times 10^3$ poises at 60° C.

4. The pneumatic tire according to claim 3, wherein the sealing material has the viscosity of not less than $3 \times 10^4$ poises at room temperature.

5. The pneumatic tire according to claim 3, wherein said sealing material has fluidity at 10° C. or more.

6. The pneumatic tire according to claim 1, wherein the bonding portions are formed such that when a circle having a diameter of 2 mm is drawn passing through any location of the bonding portion, the bonding portion contacts the continuous layer within said circle.

7. The pneumatic tire according to claim 1, wherein the bonding portions are formed through the continuous layer in the form selected from the groups consisting of small round section holes, rhombus section holes, random cuts, and narrow slits.

8. The pneumatic tire according to claim 1, wherein said continuous layer is constituted by laminating strips in a lattice fashion, and said bonding portions are formed through the continuous layer in the form of openings formed by the continuous layer in said lattice fashion.

* * * * *